United States Patent [19]

Crimmins

[11] Patent Number: 4,783,753
[45] Date of Patent: Nov. 8, 1988

[54] SYSTEM FOR REDUCING SPECKLE NOISE

[75] Inventor: Thomas R. Crimmins, Ann Arbor, Mich.

[73] Assignee: Environmental Research Inst. of Michigan, Ann Arbor, Mich.

[21] Appl. No.: 860,525

[22] Filed: May 7, 1986

[51] Int. Cl.$^4$ ............... G06F 15/68; H03F 1/266
[52] U.S. Cl. .................... 364/574; 342/25; 342/93; 364/521; 382/27; 382/54
[58] Field of Search ............ 358/36, 37; 382/27, 382/54; 364/518, 521, 572, 574, 724; 342/25, 93, 159

[56] References Cited

U.S. PATENT DOCUMENTS

| | | | |
|---|---|---|---|
| 4,227,194 | 10/1980 | Herman et al. | 342/25 |
| 4,339,752 | 7/1982 | Williams et al. | 342/25 |
| 4,360,811 | 11/1982 | Cantwell, Jr. et al. | 342/93 |
| 4,371,873 | 2/1983 | Jain | 342/25 |
| 4,541,114 | 9/1985 | Rutenbar et al. | 382/27 |
| 4,586,043 | 4/1986 | Wolf | 342/93 |
| 4,630,307 | 12/1986 | Cok | 382/27 |
| 4,648,120 | 3/1987 | Chittineni | 382/27 |
| 4,649,394 | 3/1987 | Minker et al. | 342/93 |
| 4,667,295 | 5/1987 | Preston, Jr. | 382/27 |
| 4,683,496 | 7/1987 | Tom | 382/54 |

OTHER PUBLICATIONS

"A Fast Two-Dimensional Median Filtering Algorithm"—T. S. Huang et al—Feb. 1979.
"A Theoretical Analysis of the Properties of Median Filters"—Gallagher, Jr. & Wise—12/81.
"Median Filters: Some Modifications and Their Properties"—Nodes & Gallagher, Jr.—10/82.
"State Description for the Root-Signal Set of Median Filters"—Arce & Gallagher, Jr.—12/82.

Primary Examiner—Parshotam S. Lall
Assistant Examiner—Kevin J. Teska
Attorney, Agent, or Firm—Krass and Young

[57] ABSTRACT

A method of operating a computing machine for reducing speckle noise in video images, particularly radar images, utilizes a complementary hulling technique on vertical pixel grids of the array. The vertical pixel contours which are subjected to the complementary hulling are derived from intersections of vertical grids with conceptual superposed gray-scale surfaces which have front end values corresponding to the gray-scale pixel values. The invention provides the significant advantages of decaying small image features, such as speckle noise at a significantly faster rate than large image features, such as target returns.

19 Claims, 15 Drawing Sheets

FIG. 6

SYSTEM FOR REDUCING SPECKLE NOISE

BACKGROUND OF THE INVENTION

This invention relates generally to systems for reducing noise in video display systems, and more particularly, to a digital filter for reducing the effects of speckle noise in images such as radar images.

It is desirable in a variety of video applications, and particularly in synthetic aperture radar images, to reduce speckle noise. Such reductions in speckle noise assist radar image interpreters in identifying targets and to pre-process images for automatic recognition algorithms in computers. An essential goal to be achieved is the smoothing of the speckle noise while preserving features of interest such as edges and strong returns. Since the mathematical nature of speckle noise is multiplicative, a reasonable measure of the amount of speckle noise present can be achieved by determining the ratio of the deviation of the noise to its mean. In this regard, the deviation of the speckle noise can be determined as follows:

Let $p(m,n)$, $1 \leq m,n \leq N$, be the pixel values. For $2 \leq m,n \leq N-1$, the local deviation is then definable as $$\sigma(m, n) = \max_{\substack{-1 \leq i \leq 1 \\ -1 \leq j \leq 1}} p(m + i, n + j) - \min_{\substack{-1 \leq i \leq 1 \\ -1 \leq j \leq 1}} p(m + i, n + j)$$

This expression of the deviation is not representative of the true deviation. However, it can be computed easily and provides sufficient accuracy for the purposes herein. The local mean is then definable as:

$$\mu(m, n) = 1/9 \sum_{i,j=-1}^{1} p(m + i, n + j)$$

Finally, the speckle index can be defined as:

$$\frac{1}{(N-2)^2} \sum_{m,n=2}^{N-1} \frac{\sigma(m, n)}{\mu(m, n)}$$

One well known filter which is used to reduce speckle noise in radar images is known as a "median filter." In order to facilitate understanding of the effects of the median filter, reference is made herein to several of the figures.

FIG. 1 is a radar image of an area, specifically the Willow Run Airport in Southeastern Michigan. This figure depicts a synthetic aperture radar image and is an X-band strip map image which has been digitally processed on a digital processor. The transmitter and receiver were both polarized horizontally during acquisition of the radar image of FIG. 1. The resolution, measured as the half-power width of the impulse response function is 6 m.

FIG. 2 is a sub-image of FIG. 1 and shows the area within the square in FIG. 1. The pixel spacing in FIG. 1 is 3 m and is comprised of a pixel array having 512 by 512 pixels.

FIG. 3 is a representation of the image of FIG. 2 after applying a known 3×3 median filter iteratively until the image of FIG. 3 was obtained which is of period two under the median filter. Thus, one application of the median filter will change the image very slightly, and the image will not change at all under two applications of the median filter. In this known median filter system, the 3×3 median filter replaces each pixel value with the median of the 9 pixel values in its 3×3 neighborhood window.

FIGS. 4 and 5 are shaded and shadowed versions of the images of FIGS. 2 and 3. Thus, FIGS. 4 and 5 can be considered as two-dimensional surfaces in three-dimensional space.

A further known technique which has been applied to enhance imagery is known as the 8-Hull algorithm which is used to generate approximations to the convex hulls of maximal connected subsets of the foreground of a binary image. A binary image is an image having pixels with values of only 0 or 1. The pixels with value 1 are termed the "foreground."

The convex hull of a set is the intersection of all half-planes containing it. An approximation to this, called the 8-hull, is defined as the intersection of only those half-planes which contain the set, the edges of which are either horizontal or vertical, or lie in either of the 45 degree diagonal directions. Thus, the 8-hull of a set has, at most, eight sides.

An iterative algorithm for generating the 8-hull of a set operates by changing the value of a pixel from a zero to a one if its neighboring pixels have ones arranged in any one of the configurations shown in FIG. 6. The blank squares can be either zeros or ones. If enough iterations of this step are performed, eventually the 8-hull of the given set will be generated and it will be invariant under further iterations.

FIGS. 7 to 10 illustrate a sequence which is formed while an 8-hull of a set is being produced. In these figures, the black squares represent ones and the white squares represent zeros. FIG. 7 depicts an original set, and FIG. 8 shows the results after one iteration of the 8-hull algorithm. FIGS. 9 and 10 illustrate the results after two and three iterations, respectively. The shape shown in FIG. 10 remains invariant under further iterations.

A still further iterative algorithm, which is used for smoothing the ragged edges of the foreground set in a binary image, shall be discussed herein as the "complementary hulling algorithm." In one iteration of the complementary hulling algorithm, first, one step of the 8-hull algorithm described hereinabove is applied to the set, and then one step of the 8-hull algorithm is applied to its complement. Thus, one step of the 8-hull algorithm is applied, and then the zeros and ones are interchanged. Another step of the 8-hull algorithm is then applied, and finally the zeros and ones are interchanged again. This has the effect of gradually reducing the maximum curvature of the boundary of the set, where curvature is the inverse of the radius of curvature. More specifically, with few exceptions, the boundary of a set invariant under this algorithm can turn a maximum of 45 degrees at any vertex. The only known exceptions to this rule are the boundary segments shown in FIG. 11 and their 90-degree rotations.

The complementary hulling algorithm is applied herein, for purposes of illustration, to the set of FIG. 12. FIGS. 13 through 16 show the results of 1, 2, 3, and 9 iterations, respectively, The shape shown in FIG. 16 remains invariant under further iterations.

FIG. 17 shows a tower three pixels wide. If one imagines going up the left side of this tower, and then down the right side, a sharp U-turn must be made at the top.

This U-turn has too high a curvature to be permissable. Hence, the complementary hulling algorithm reduces the curvature until it is sufficiently small. FIGS. 18 through 21 illustrate the results of 1, 2, 14, and 15 iterations, respectively, of the complementary algorithm. The shape shown in FIG. 21, which corresponds to 15 iterations, remains invariant under further iterations.

FIG. 22 shows a tower seven pixels wide. In this situation, the U-turn can be made without requiring too high a curvature. FIGS. 23 through 25 illustrate shapes resulting after 1, 2, and 3 iterations of the complementary hulling algorithm, respectively. The shape of FIG. 25 remains invariant under further iterations. In contrast to the invariant shape shown in FIG. 21, which corresponds to 15 iterations on a three-pixel wide tower, the seven-pixel wide tower of FIG. 25 has its corners rounded, but the height of the tower is not reduced.

It is, therefore, an object of this invention to provide a simple and inexpensive system for reducing speckle noise in imagery.

It is another object of this invention to provide an iterative system for reducing speckle noise wherein relatively few iterations are required to reduce the speckle noise.

It is also an object of this invention to provide a symmetrical speckle noise reduction system whereby the filling up of valleys is essentially equivalent to the tearing down of walls in a binary image.

It is additionally an object of this invention to provide a speckle noise reduction system wherein rapid reduction of the noise is achieved without elimination of the desired image features.

SUMMARY OF THE INVENTION

The foregoing and other objects are achieved in this invention which provides in a general aspect thereof, a method of operating a computing machine for reducing speckle noise in a video image of the type formed of an m×n array of pixel elements. Each pixel element has a respective gray-scale value (V) associated therewith, where zero is less than or equal to V which is less than or equal to K. K is a maximum gray-scale value. After the m×n gray-scale values are stored in a memory, a plurality of individual ones of gray-scale values are identified in accordance with a predetermined adjacent neighboring arrangement in the m×n array. Thus, for example, such neighboring adjacent ones of the gray-scale values can correspond to a row, column, diagonal, or any other arrangement of adjacent neighboring gray-scale values. Each of the gray-scale values in the predetermined arrangement is subjected to a value-adjustment test. In response to this test, each gray-scale value may be changed, such as by incrementing by a predetermined amount, in response to the immediately prior and subsequent adjacent gray-scale values. Thus, looking at one such gray-scale value within the predetermined neighboring arrangement, $V_A$ is the immediately prior gray-scale value, $V_B$ is the gray-scale value being tested, and $V_C$ is the immediately subsequent gray scale value. In accordance with the invention, the gray-scale value under test, $V_B$, is incremented if one of the following four conditions, which depend on a positive input parameter I, is satisfied:

(1) if $(V_B+I)<V_A$, then set $V_{BN}$ equal to the minimum of $(V_A-I)$ and $(V_B+I)$;

(2) if $V_B<V_A$ and $V_B<(V_C+I)$, then set $V_{BN}$ equal to the minimum of $V_A$, $(V_B+I)$, and $(V_C+I)$;

(3) if $V_B<V_C$ and $V_B<(V_A+I)$, then set $V_{BN}$ equal to the minimum of $V_C$, $(V_B+I)$, and $(V_A+I)$; and (4) if $(V_B+I)<V_C$, then set $V_{BN}$ equal to the minimum of $(V_C-I)$ and $(V_B+I)$.

If any one of these conditions is satisfied, then the new value $V_{BN}$ is stored in memory in place of $V_B$.

The test to which the gray-scale value $V_B$ has been subjected is repeated for every gray-scale value in the predetermined adjacent neighboring arrangement. Preferably, the four conditions are applied sequentially to the gray-scale values in the predetermined arrangement.

After the application of such a test, which corresponds to the first step of a hull algorithm, the gray-scale value in the predetermined arrangement are complemented by subtracting their values from K. The resulting complemented values are then subjected again to the test, with the same four conditions, and the resulting values are complement-restored by subtracting once again from K. All of the foregoing steps are then repeated on a further plurality of gray-scale values identified as a new predetermined adjacent neighboring arrangement. In a specific embodiment of the invention, the foregoing testing process is applied to all gray-scale values several times, since the plurality of neighboring arrangements correspond to all of the rows running east and west, all of the columns running north and south, all of the diagonals running southwest and northeast, and all of the diagonals running northwest and southeast.

BRIEF DESCRIPTION OF THE DRAWINGS

Comprehension of the invention is facilitated by reading the following detailed description in conjunction with the annexed drawing, in which:

FIG. 6 illustrates eight patterns which can be used by the 8-hull algorithm;

DETAILED DESCRIPTION

The present invention is directed to a non-linear system which is based on geometric concepts and is particularly useful in reducing speckle noise in synthetic aperture radar images. In so doing, the present invention assists interpreters of radar images and in the pre-processing of images for automatic recognition of targets and items in the image by computers. In a specific illustrative embodiment of the geometric digital filter of the present invention, approximately ten iterations will result in optimal speckle noise reduction. However, a significant reduction in speckle-noise can be achieved with just two or three iterations.

The following table of speckle indices illustrates the advantageous speckle-reducing aspects of the present invention:

TABLE I

| IMAGE | SPECKLE INDEX |
| --- | --- |
| Original Image | 1.400 |
| 4 Iterations of Geometric Filter | 0.380 |
| 10 Iterations of Geometric Filter | 0.182 |
| Period 2 Median Root | 0.333 |

Figure 1:
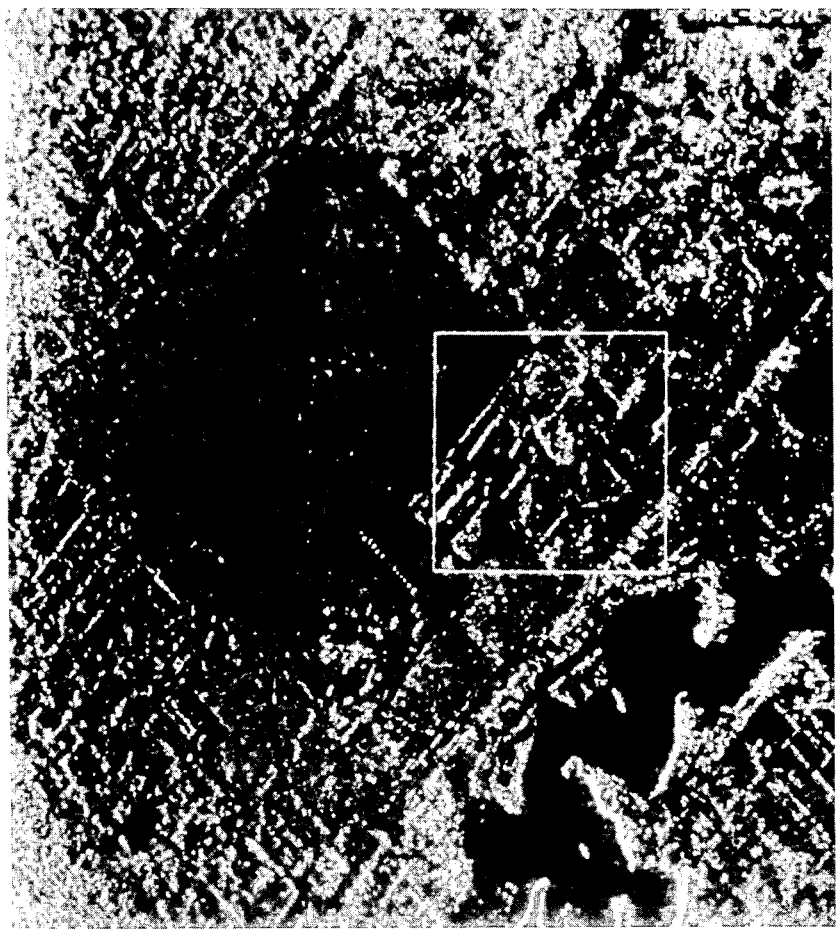
FIG. 1 is a synthetic aperture radar image of Willow Run Airport in southeastern Michigan.
Figure 2:
FIG. 2 is an expanded representation of the area contained within the square of FIG. 1.
Figure 3:
FIG. 3 is a representation of the image of FIG. 2 after being subjected to many iterations of a prior art median filter.
Figure 29:
FIGS. 29 and 30 are images corresponding to FIG. 2 after 4 and 10 iterations, respectively, of the subject geometric filter.
Figure 30:

As previously indicated, FIG. 1 is a synthetic aperture radar image of the Willow Run Airport in southeastern Michigan. FIGS. 29 and 30 illustrate the region within the square of FIG. 1 after having been subjected to 4 and 10 iterations, respectively, of the geometric filter of the present invention. For the purposes of comparison, FIG. 3, which was discussed hereinabove, illustrates the results of applying a 3×3 median filter iteratively until an image of the period 2 under the median filter was obtained.

Figure 4:
FIG. 4 is a shaded and shadowed version of FIG. 2.
Figure 5:
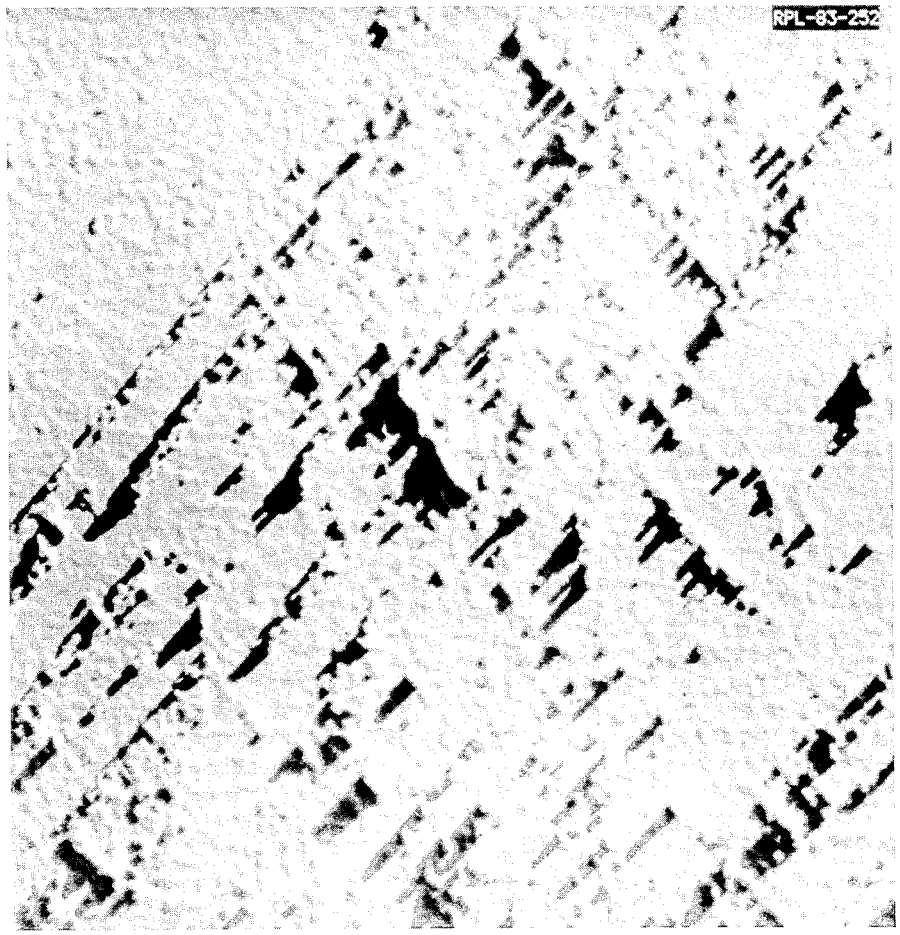
FIG. 5 is a shadowed and shaded version of FIG. 3.
Figure 7:
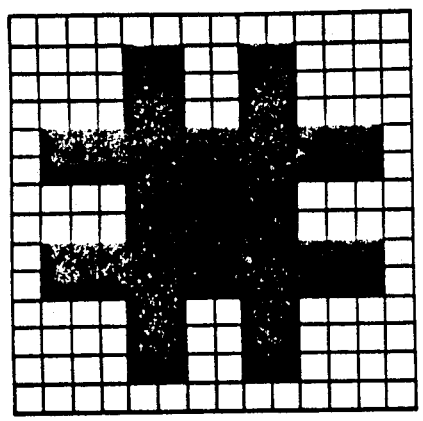
FIG. 7 is an original binary image set.
Figure 8:
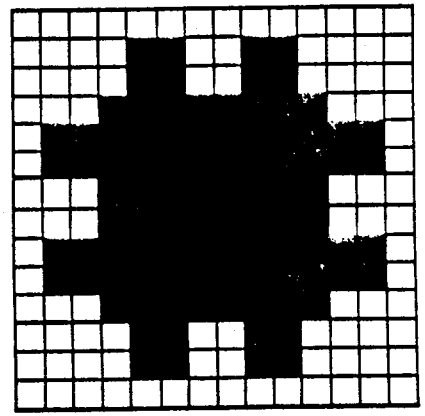
FIGS. 8, 9, and 10 are binary image representations of the shape shown in FIG. 7 after 1, 2, and 3 iterations of an 8-hull algorithm, respectively.
Figure 9:
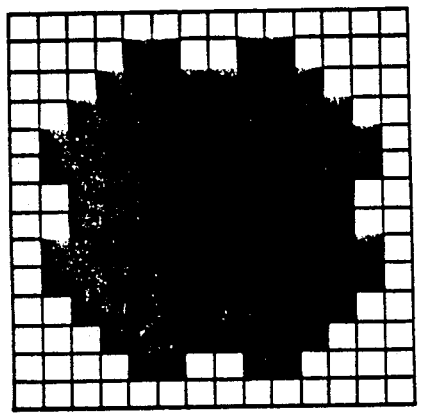
Figure 10:
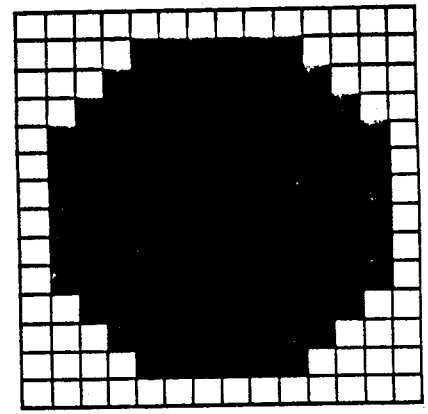
Figure 11:
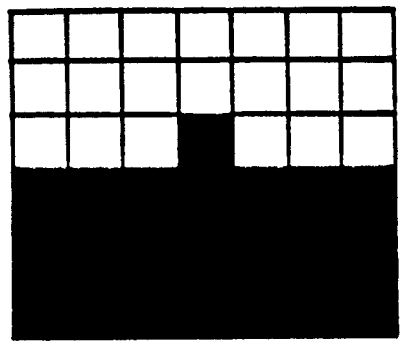
FIG. 11 is a binary representation of exceptions to the rule that the boundary of a set which is invariant under the complementary hulling algorithm can turn a maximum of 45° at any vertex.
Figure 11:
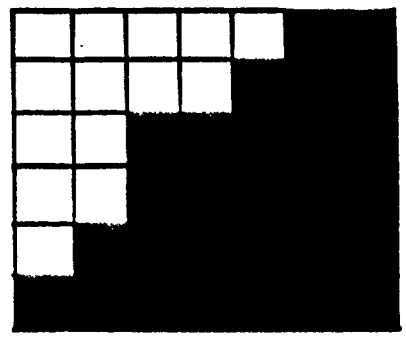
Figure 12:
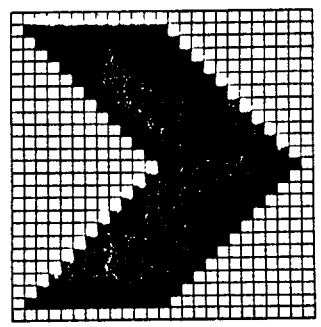
FIG. 12 is a representation of an original set of a binary image.
Figure 13:
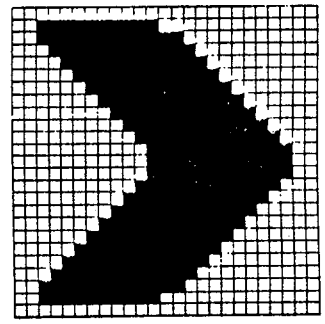
FIGS. 13, 14, 15, and 16 are binary image representations of the shape shown in FIG. 12 after 1, 2, 3, and 9 iterations of a complementary hulling algorithm, respectively.
Figure 14:
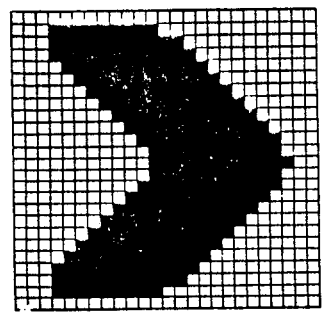
Figure 15:
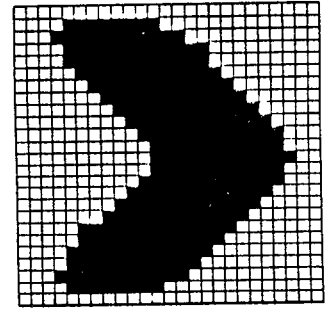
Figure 16:
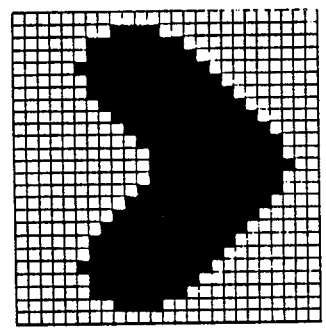
Figure 17:
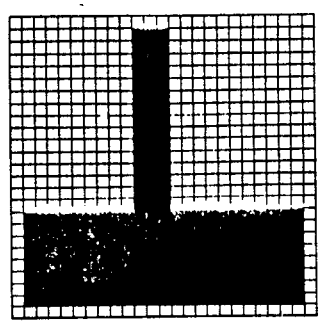
FIG. 17 is a binary image representation of a tower three pixels wide.
Figure 18:
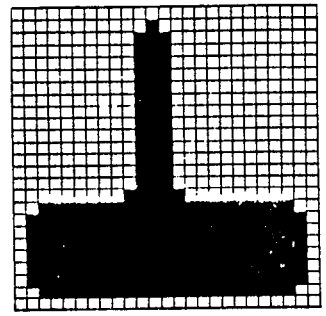
FIGS. 18, 19, 20, and 21 are binary image representations of the shape shown in FIG. 17 after 1, 2, 14, and 15 iterations, respectively, of a complementary hulling algorithm.
Figure 19:
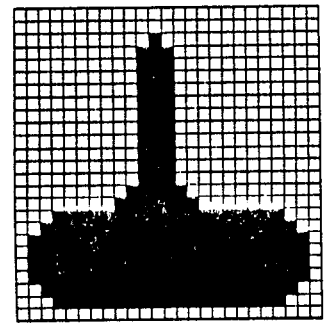
Figure 20:
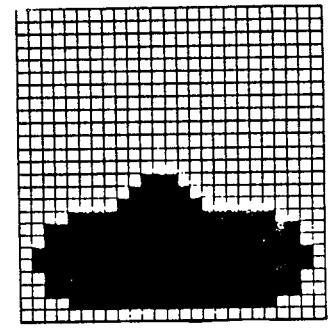
Figure 21:
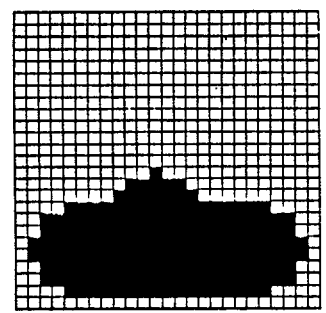
Figure 22:
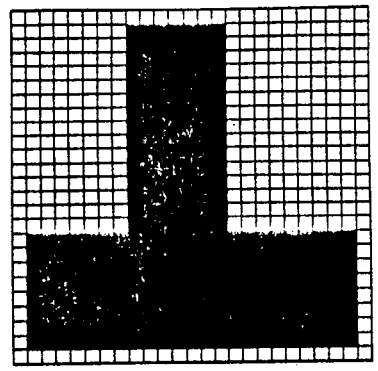
FIG. 22 is a binary image representation of a tower seven pixels wide.
Figure 23:
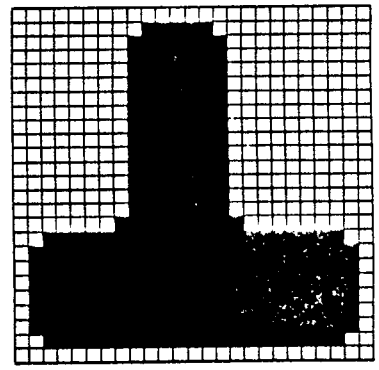
FIGS. 23, 24 and 25 are binary image representations of the shape shown in FIG. 22 after 1, 2, and 3 iterations of a complementary hulling algorithm.
Figure 24:
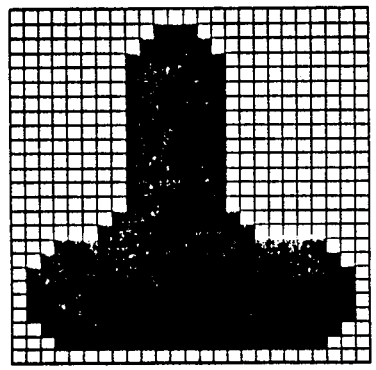
Figure 25:
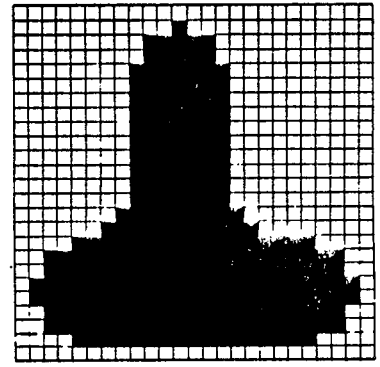
Figure 31:
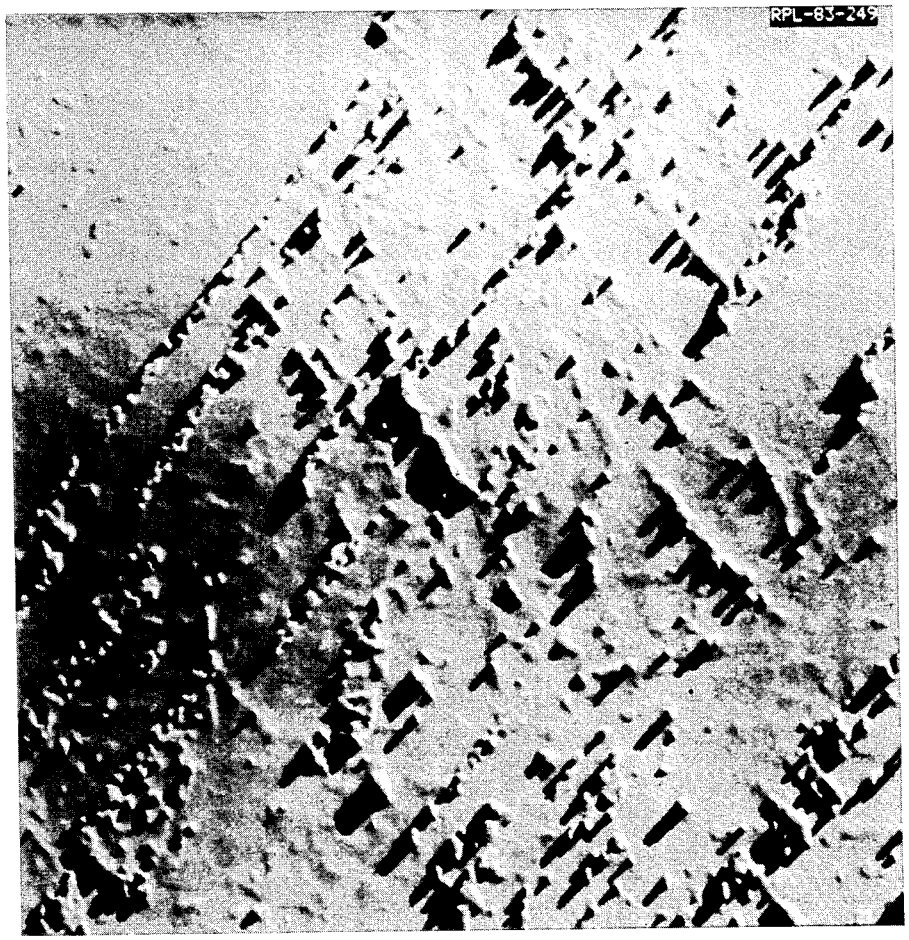
FIG. 31 is a shaded and shadowed version of FIG. 4 after 10 iterations of the present geometric filter.

FIG. 31 is a shaded and shadowed version of FIG. 30 and illustrates that significantly greater smoothing can be achieved over the original image (See FIG. 4), and even over the period 2 median root (see FIG. 5).

In a specific illustrative embodiment of the invention where pixel values, or gray-scale values, are between zero and 255, inclusive, the geometric filter of the present invention operates as follows:

First, the reader is requested to conceptualize a gray-level radar image lying horizontally with its sides running in the north-south direction and its top and bottom running in the east-west direction. Now, imagine a gray-level surface arranged above the image such that its height above any pixel is proportional to the value of the gray-scale of that pixel. Thus, this gray-level surface has bumps and valleys in correspondence to the gray-scale values of the pixels of the original radar image. The superposed surface is then sliced by a vertical plane which contains a line of adjacent neighboring pixels running in the east-west direction. Thus, if the original radar image is deemed to be an m×n array of gray-scale values, the vertical plane extends orthogonally upward along a row of the array.

Figure 26:
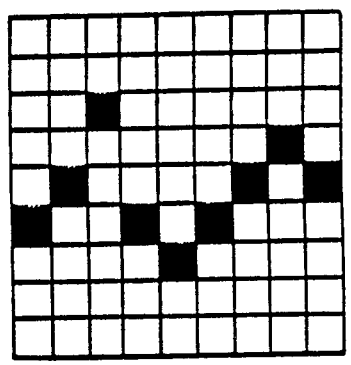
FIG. 26 is a binary representation of a curve formed of vertical pixels.

FIG. 26 is an illustrative binary image of a curve which is formed by vertical pixel values on the vertical plane. In essence, each black space corresponds to the particular vertical value where the superposed gray-level surface intersects the vertical plane. The points in this vertical grid will be referred to as "vertical pixels."

Figure 27:
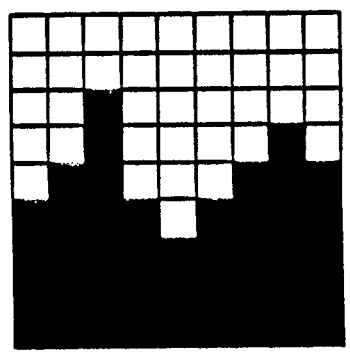
FIG. 27 is a binary representation of an umbra corresponding to the curve of FIG. 26.

FIG. 27 is a binary image representation of an umbra of the curve of FIG. 26. The umbra consists of all vertical pixels in the vertical grid on or below the curve. If a value of one is assigned to all vertical pixels in the umbra, and the value zero is assigned to all other vertical pixels in the vertical grid, then the vertical grid can be considered as a binary image. It is to be noted that the binary image discussed herein need not be formed in order to practice the present invention. It is, however, useful in assisting in conceptualization of the present invention.

The umbra of FIG. 27 is now subjected to the first half of an iterative step of the complementary hulling algorithm. Since we are presently concerned only with the line forming the top boundary of the umbra, only the top four configurations of FIG. 6 need to be used. More specifically, referring for the moment to FIG. 6, the central pixel containing a zero is converted to a one if its neighboring ones assume the shown configuration. The blank pixel location can be valued either as zero or one.

Figure 28:
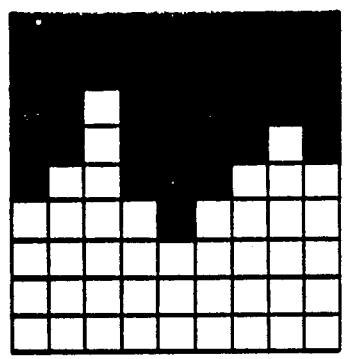
FIG. 28 is a binary representation of the complement of FIG. 27.

After the umbra of FIG. 27 has been subjected to the first half of the iterative step of the complementary hulling (not shown in the drawing), the complement of the umbra is formed, as shown in FIG. 28. This is achieved by reversing zeros to ones and ones to zeros. This complement of the umbra is then subjected to the second half of an iterative step of the complementary hulling algorithm, thereby using the lower four configurations shown in FIG. 6. The complementary hulling algorithm is then completed by complementing back so that a complement-restored umbra is produced (not shown in the drawing).

The foregoing procedure is performed on all east-west vertical grids simultaneously and the resulting gray-scale values replace the original gray-scale values. The same procedure is then repeated on all southwest-northeast diagonals, then in the south-north rows, and finally in the southeast-northwest diagonals. This completes an entire iterative step of the geometric filter of the present invention.

Figure 6:
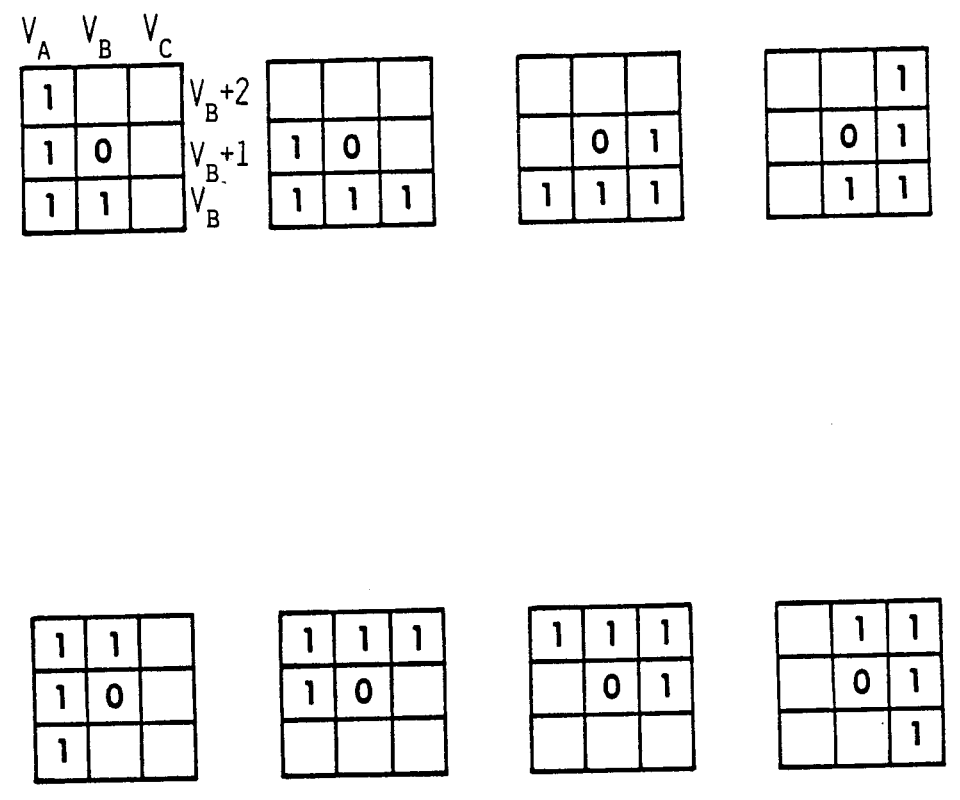

In specific illustrative embodiments of the invention which are practiced in accordance with the configurations of FIG. 6, the value of a vertical pixel is essentially incremented by one if any of the top four configurations of FIG. 6 are satisfied. However, in other embodiments, an incrementation parameter, I, may be entered into the system to control the rate of incrementation and therefore the number of iterations required to achieve the desired level of smoothing. Thus, in embodiments of the invention where very high values are permissible for the gray-scale values, illustratively between zero and 30,000, or more, the incrementation parameter may be more than one. In embodiments of the invention where the complement of the umbra is subjected to the second half of the complementary hulling algorithm, thereby using the last four configurations of FIG. 6, a decrementation parameter, D, which may be greater than one, may be used.

It is further to be noted that, in the practice of the invention, satisfactory results can be achieved using only a selectable one of the first four or the second four configurations of FIG. 6 if complementation of the umbra is achieved by subtracting the vertical pixel values from the maximum pixel value, K. Of course, after the complemented umbra is subjected to the hulling algorithm, it must be complement-restored to its original orientation by any of several methods, including simple subtraction of the new value from the maximum value, K.

In order to increase the rate of speckle noise reduction, the application of an iterative step of the 8-hull algorithm to the umbra of a vertical slice is changed as follows:

Instead of changing a zero to a one if any of the first four neighborhood configurations in FIG. 6 are present, these four configurations are used separately and consecutively. Thus, first a zero is changed to a one if the first of these four configurations is present, then the resulting image replaces the original image. Subsequently, the second configuration is used, the resulting image again replaces the original image, and the process continues until all such first four configurations have been used. Similarly, in embodiments of the invention where the second four configurations of FIG. 6 are used, these also are applied separately and consecutively to the complement. This results in a greater amount of modification of the image in each iterative step and therefore fewer iterations are required. In addition, a greater difference is achieved between the reduction rates of wide and narrow features.

In the practice of the present invention, it is recognized that speckle noise has a wormy appearance. Considering the image as a curved two-dimensional surface in a three-dimensional space, as described hereinabove, speckle noise appears as narrow winding walls and valleys. A strong target return appears as a wide tall tower. The entire body of the target appears as an even wider high plateau, although it is not as high as the tower representing a strong target return. The geometric filter of the present invention, through iterative repetition, gradually tears down the narrow walls and fills up the narrow valleys. It also tears down towers and high plateaus which are desired to be preserved. However, narrow walls and valleys are reduced faster than wide towers are reduced, and wide plateaus are reduced even more slowly than wide towers. In general, the wider any landscape feature is, such as valleys, holes, depressions, walls, towers, or plateaus, the more slowly it is reduced. Thus, only a few iterations are required to reduce the narrow speckle walls and valleys, and these few iterations have very little effect on wide high towers. Hence, strong target returns are preserved, as are wide plateaus. In this manner, target shape is preserved.

Since the filter of the present invention is designed to operate both on the umbra of the image surface and its complement, it is essentially symmetrical with respect to up and down, or towers and valleys. Thus, the filling up of valleys is essentially equivalent to the tearing down of walls. The following tables, tables II and III, show the rate at which the height (maximum) of walls and square towers are being reduced.

TABLE II

Reduction Rates For Square Towers

| Tower size | Reduction of max. per iteration less number of vertical pixels, i.e., units of intensity |
|---|---|
| 1 × 1 | 16 |
| 2 × 2 | 9 |
| 3 × 3 | 6 |
| 4 × 4 | 5 |
| 5 × 5 | 4 |
| 6 × 6 | 3 |
| 7 × 7 | 2 |
| 8 × 8 | 2 |

TABLE III

Reduction Rates For Walls

| Wall Width | Reduction of max. per iteration less number of vertical pixels, i.e., units of intensity |
|---|---|
| 1 | 12 |
| 2 | 6 |
| 3 | 3 |
| 4 | 3 |
| 5 | 2 |
| 6 | 1.5 |
| 7 | 0 |

As shown in Table II, the rate at which the maximum height of towers is reduced decreases as the size of the towers increase. Similarly, Table III illustrates that the reduction rate for walls decreases as the width of the walls increases. Tables II and III show the rates of reduction for square towers and walls after the first few iterations. The reduction rates may be less for the first few iterations. This lag is important for wider towers since, for example, the maximum of a 14×14 tower is not reduced at all until the fifth iteration.

In certain situations, a strong target return may be in the form of a tower which is almost as narrow as the speckle walls and valleys. However, such a tower is usually much higher than the speckle walls are high or valleys deep. Thus, although the strong target return may be reduced at as fast a rate as the speckle walls and valleys, the walls and valleys will still be reduced before the tower is completely torn down and hence the strong target return will still be preserved. However, the target return will be dimmer than in the original image.

Referring for the moment to FIG. 6, it can be seen that the first four configurations therein can be reduced to the following four inequalities:

(1) $(V_B+2) \leq V_A$;
(2) $V_C \geq V_B < V_A$;
(3) $V_A \geq V_B < V_C$; and
(4) $(V_B+2) \leq V_C$.

In similar manner, the last four configurations of FIG. 6, which are used in the second half of an iterative step of the complementary hulling algorithm, can be reduced to the following four respective complementary inequalities:

(1) $(V_{BN}-2) \geq V_{AN}$;
(2) $V_{CN} \leq V_{BN} > V_{AN}$;
(3) $V_{AN} \leq V_{BN} > V_{CN}$; and
(4) $(V_{BN}-2) \geq V_{CN}$.

In a more generalized case where incrementation is determined by the incrementation parameter I, where zero is less than I, then the first four configurations of FIG. 6 can be expressed as follows, where $V_{BN}$ is the new value to be stored in the memory as replacing the old value $V_B$.

(1) if $(V_B+I)<V_A$, then set $V_{BN}$ equal to the minimum of $(V_A-I)$ and $(V_B+I)$;

(2) if $V_B<V_A$ and $V_B<(V_C+I)$, then set $V_{BN}$ equal to the minimum of $V_A$, $(V_B+I)$, and $(V_C+I)$;

(3) if $V_B<V_C$ and $V_B<(V_A+I)$, then set $V_{BN}$ equal to the minimum of $V_C$, $(V_B+I)$, and $(V_A+I)$; and (4) if $(V_B+I)<V_C$, then set $V_{BN}$ equal to the minimum of $(V_C-I)$ and $(V_B+I)$.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and descriptions in this disclosure are proffered to facilitate comprehension of the invention and should not be construed to limit the scope thereof.

What is claimed is:

1. A method for reducing speckle noise in a video image, said video image being formed of an m×n array of pixel elements, each pixel element having a respective gray-scale value (V) associated therewith, where zero is less than or equal to V which is less than or equal to K, here K is a maximum gray-scale value, the method comprising the steps of:

storing said video image in a memory by storing each of said m×n gray-scale values of corresponding pixel elements;

transforming said video image by recalling said gray-scale value, $V_B$, of each pixel element, comparing said gray-scale value $V_B$ of each pixel element with the gray-scale value, $V_A$, of a first immediately adjacent pixel element and the gray-scale value, $V_C$, of a second immediately adjacent pixel element opposite to said first immediately adjacent pixel element and substituting a new gray-scale value, $V_{BN}=V_B+1$, for said gray-scale value, $V_B$, of the corresponding pixel element in response to at least one of the four following conditions being satisfied: $(V_B+2) \leq V_A$; $V_C \geq V_B < V_A$; $V_A \geq V_B < V_C$; $(V_B+2) \leq V_C$; and substituting said transformed video image for said video image in said memory.

2. The method of claim 1 wherein said first immediately adjacent pixel element and said second immediately adjacent pixel element opposite to said first immediately adjacent pixel element of each pixel element of said transforming step are disposed in a row of the m×n array.

3. The method of claim 1 wherein said first immediately adjacent pixel element and said second immediately adjacent pixel element opposite to said first immediately adjacent pixel element of each pixel element of said transforming step are disposed in a column of the m×n array.

4. The method of claim 1 wherein said first immediately adjacent pixel element and said second immediately adjacent pixel element opposite to said first immediately adjacent pixel element of each pixel element of said transforming step are disposed in a diagonal of the m×n array.

5. The method for reducing speckle noise in a video image as claimed in claim 1, further comprising the steps of:

transforming said transformed video image stored in the memory into a complementary video image by substituting the gray-scale value $V_{BC}=K-V_{BN}$ for the gray-scale value $V_{BN}$ for each of said m×n array of picture elements;

transforming said complementary video image by recalling said gray-scale value, $V_{BC}$, of each pixel element, comparing said gray-scale value $V_{BC}$ of each pixel element with the gray-scale value, $V_{AC}$, of a first immediately adjacent pixel element and the gray-scale value, $V_{CC}$, of a second immediately adjacent pixel element opposite to said first immediately adjacent pixel element and substituting a new gray-scale value, $V_{BCN}=V_{BC}+1$, for said gray-scale value, $V_{BC}$, of the corresponding pixel element in response to at least one of the four following conditions being satisfied: $(V_{BC}+2) \leq V_{AC}$; $V_{CC} \geq V_{BC} < V_{AC}$; $V_{AC} \geq V_{BC} < V_{CC}$; $(V_{BC}+2) \leq V_{CC}$;

transforming said complementary video image into a complement restored video image by substituting the gray-scale value $V_{BR}=K-V_{BCN}$ for the gray-scale value $V_{BCN}$ for each of said m×n array of picture elements;

substituting said complement restored video image for said transformed video image in said memory.

6. The method for reducing speckle noise in a video image as claimed in claim 1, futher comprising the steps of:

further transforming said transformed video image by recalling said gray-scale value, $V_{BN}$, of each pixel element, comparing said gray-scale value $V_{BN}$ of each pixel element with the gray-scale value, $V_{AN}$, of a first immediately adjacent pixel element and the gray-scale value, $V_{CN}$, of a second immediately adjacent pixel element opposite to said first immediately adjacent pixel element and substituting a new gray-scale value, $V_{BNN}=V_{BN}-1$, for said gray-scale value, $V_{BN}$, of the corresponding pixel element in response to at least one of the four following conditions being satisfied: $(V_{BN}+2) \geq V_{AN}$; $V_{CN} \leq V_{BN} > V_{AN}$; $V_{AN} \leq V_{BN} > V_{CN}$; $(V_{BN}+2) \geq V_{CN}$; and substituting said further transformed video image for said transformed video image in said memory.

7. The method for reducing speckle noise in a video image as claimed in claim 1, further comprising the step of:

generating a visually perceivable indication of said transformed video image.

8. A method for reducing speckle noise in a video image, said video image being formed of an m×n array of pixel elements, each pixel element having a respective gray-scale value (V) associated therewith, where $0 \leq V \leq K$, where K is a maximum gray-scale value, the method comprising the steps of:

storing said video image in a memory by storing each of said m×n gray-scale values of corresponding pixel elements;

transforming said video image by recalling said gray-scale value, $V_B$, of each pixel element, comparing said gray-scale value $V_B$ of each pixel element with the gray-scale value, $V_A$, of a first immediately adjacent pixel element and the gray-scale value, $V_C$, of a second immediately adjacent pixel element opposite to said first immediately adjacent pixel element and substituting a new gray-scale value, $V_{BN}$ for said gray-scale value, $V_B$, of the corresponding pixel element in response to at least one of the four following conditions:

if $(V_B+I)<V_A$, then set $V_{BN}$ equal to the minimum of $(V_A-I)$ and $(V_B+I)$;

if $V_B<V_A$ and $V_B<(V_C+I)$, then set $V_{BN}$ equal to the minimum of $V_A$, $(V_B+I)$ and $(V_C+I)$;

if $V_B<V_C$ and $V_B<(V_A+I)$, then set $V_{BN}$ equal to the minimum of $V_C$, $(V_B+I)$ and $(V_A+I)$; and if $(V_B+I)<V_C$, then set $V_{BN}$ equal to the minimum of $(V_C-I)$ and $(V_B+I)$ where I is a predetermined constant, $0<I$;

substituting said transformed video image for said video image in said memory.

9. The method for reducing speckle noise in a video image as claimed in claim 8, further comprising the steps of:

transforming said transformed video image stored in the memory into a complementary video image by substituting the gray-scale value $V_{BC}=K-V_{BN}$ for the gray-scale value $V_{BN}$ for each of said m×n array of picture elements;

transforming said complementary video imge by recalling said gray-scale value, $V_{BC}$, of each pixel element, comparing said gray-scale value $V_{BC}$ of each pixel element with the gray-scale value, $V_{AC}$, of a first immediately adjacent pixel element and the gray-scale value, $V_{CC}$, of a second immediately adjacent pixel element opposite to said first immediately adjacent pixel element and substituting a new gray-scale value, $V_{BN}$ for said gray-scale value, $V_B$, of the corresponding pixel element in response to at least one of the four following conditions:

if $(V_{BC}+I)<V_{AC}$, then set $V_{BCN}$ equal to the minimum of $(V_{AC}-I)$ and $(V_{BC}+I)$, if $V_{BC}<V_{AC}$ and $V_{BC}<(V_{CC}+I)$, then set $V_{BCN}$ equal to the minimum of $V_{AC}$, $(V_{BC}+I)$ and $(V_{CC}+I)$, if $V_{BC}<V_{CC}$ and $V_{BC}<(V_{AC}+I)$, then set $V_{BCN}$ equal to the minimum of $V_{CC}$, $(V_{BC}+I)$ and $(V_{AC}+I)$ and if $(V_{BC}+I)<V_{CC}$, then set $V_{BCN}$ equal to the minimum of $(V_{CC}-I)$ and $(V_{BC}+I)$, where I is a predetermined constant, $0<I$;

transforming said complementary video image into a complement restored video image by substituting the gray-scale value $V_{BR}=K-V_{BCN}$ for the gray-scale value $V_{BCN}$ for each of said m×n array of picture elements; and substituting said complement restored video image for said transformed video image in said memory.

10. The method for reducing speckle noise in a video image as claimed in claim 8, further comprising the step of:

generating a visually perceivable indication of said transformed video image.

11. The method for reducing speckle noise in a video image as claimed in claim 8 wherein said first immediately adjacent pixel element and said second immediately adjacent pixel element opposite to said first immediately adjacent pixel element of each pixel element of said transforming step are disposed in a row of the m×n array.

12. The method for reducing speckle noise in a video image as claimed in claim 8 wherein said first immediately adjacent pixel element and said second immediately adjacent pixel element opposite to said first immediately adjacent pixel element of each pixel element of said transforming step are disposed in a column of the m×n array.

13. The method for reducing speckle noise in a video image as claimed in claim 8 wherein said first immediately adjacent pixel element and said second immediately adjacent pixel element opposite to said first immediately adjacent pixel element of each pixel element of said transforming step are disposed in a diagonal of the m×n array.

14. The method for reducing speckle noise in a video image as claimed in claim 8, wherein:

said step of transforming said video image consists of substituting said new gray-scale value, $V_{BN}$ for said gray-scale value, $V_B$, of the corresponding pixel element in accordance with a first of said four conditions to each pixel element of said video image, followed by substituting said new gray-scale value, $V_{BN}$ for said gray-scale value, $V_B$, of the corresponding pixel element in accordance with a second of said four conditions to each pixel element of said video image, followed by substituting said new gray-scale value, $V_{BN}$ for said gray-scale value, $V_B$, of the corresponding pixel element in accordance with a third of said four conditions to each pixel element of said video image, followed by substituting said new gray-scale value, $V_{BN}$ for said gray-scale value, $V_B$, of the corresponding pixel element in accordance with a fourth of said four conditions to each pixel element of said video image.

15. A method for reducing speckle noise in a video image, said video image being formed of an m×n array of pixel elements, each such pixel element having a respective gray-scale value V associated therewith, the method comprising the steps of:

forming said video image into a binary three dimensional contour map having horizontal axes corresponding to said m×n array of pixel elements and having a vertical axis corresponding to the gray-scale values, each element in said binary three dimensional contour map being a "0" except elements corresponding to the gray-scale value of said each pixel element within said m×n array of pixel elements being a "1";

forming a first umbra from said binary three dimensional contour map by changing all elements of said binary binary dimensional contour map below an element having a value of "1" into a value of "1";

transforming said first umbra into a second umbra via a hulling process by dividing said first umbra into a plurality of first umbra vertical planes, each first umbra vertical plane including a line of adjacent elements corresponding to a line of adjacent pixel elements of said m×n array of pixel elements, transforming each of said first umbra vertical planes into a transformed first umbra vertical plane via a hulling process by changing elements having values of "0" to values of "1" if the immediately adjacent elements have one of a predetermined set of values, and forming said second umbra by assembly of said transformed first umbra vertical planes;

transforming said second umbra into a third umbra by changing the value of each element of said second umbra having a value "1" to a value of "0" and changing the value of each element having a value of "0" to a value of "1";

transforming said third umbra into a fourth umbra via a complementary hulling process by dividing said third umbra into a plurality of third umbra vertical planes, each third umbra vertical plane including a line of adjacent elements corresonding to a line of adjacent pixel elements of said m×n array of pixel elements, transforming each of said third umbra vertical planes into a transformed third umbra vertical plane via a complementary hulling process by changing elements having values of "1" to values of "0" if the immediately adjacent elements have one of a predetermined set of values complementary to said predetermined set of values of said hulling process, and forming said fourth umbra by assembly of said transformed third umbra vertical planes;

transforming said fourth umbra into a fifth umbra by changing the value of each element of said fourth umbra having a value "1" to a value of "0" and changing the value of each element having a value of "0" to a value of "1";

forming a transformed video image from said fifth umbra by setting the gray-scale value of each pixel element of said m×n array of pixel elements equal to the height of the highest element having a value "1" of said fifth umbra having a corresponding location on said horizontal axes; and replacing said video image with said transformed video image.

16. The method for reducing speckle noise in a video image as claimed in claim 15, wherein:
said first umbra vertical planes and said third umbra vertical planes correspond to rows of said m×n array of pixel elements.

17. The method for reducing speckle noise in a video image as claimed in claim 15, wherein:
said first umbra vertical planes and said third umbra vertical planes correspond to columns of said m×n array of pixel elements.

18. The method for reducing speckle noise in a video image as claimed in claim 15, wherein:
said first umbra vertical planes and said third umbra vertical planes correspond to diagonals of said m×n array of pixel elements.

19. The method for reducing speckle noise in a video image as claimed in claim 15, further comprising the step of:
generating a visually perceivable indication of said transformed video image.

* * * * *

UNITED STATES PATENT AND TRADEMARK OFFICE
CERTIFICATE OF CORRECTION

PATENT NO. : 4,783,753

DATED : November 8, 1988

INVENTOR(S) : Crimmins

It is certified that error appears in the above-identified patent and that said Letters Patent is hereby corrected as shown below:

Column 2, line 64, "The" should be --the--.

Column 3, line 60, "gray scale" should be --gray-scale--.

Column 5, line 13, "4" should be --30.--.

Column 5, line 14, "after 10 iterations of the present geometric filter." should be deleted.

Signed and Sealed this

Twenty-third Day of May, 1989

Attest:

DONALD J. QUIGG

*Attesting Officer*          *Commissioner of Patents and Trademarks*